(12) United States Patent
Ishimoto

(10) Patent No.: US 7,948,919 B2
(45) Date of Patent: May 24, 2011

(54) NETWORK TERMINAL DEVICE

(75) Inventor: Kan Ishimoto, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 521 days.

(21) Appl. No.: 11/481,908

(22) Filed: Jul. 7, 2006

(65) Prior Publication Data
US 2007/0013936 A1    Jan. 18, 2007

(30) Foreign Application Priority Data

Jul. 8, 2005 (JP) .................................. 2005-200033

(51) Int. Cl.
*G06F 3/12* (2006.01)
(52) U.S. Cl. ...... 370/254; 370/255; 358/1.13; 358/1.15; 709/220; 709/223; 709/224
(58) Field of Classification Search .................. 370/225, 370/400, 252, 235, 254; 709/223, 224, 225; 715/246, 275, 853, 854; 713/151, 152, 153
See application file for complete search history.

(56) References Cited

U.S. PATENT DOCUMENTS

| | | | | |
|---|---|---|---|---|
| 4,644,532 A * | 2/1987 | George et al. | ............... | 370/255 |
| 5,787,248 A | 7/1998 | Zupcsics et al. | | |
| 5,821,937 A * | 10/1998 | Tonelli et al. | ............... | 715/853 |
| 6,425,007 B1 * | 7/2002 | Messinger | ............... | 709/224 |
| 6,584,499 B1 | 6/2003 | Jantz et al. | | |
| 7,076,650 B1 * | 7/2006 | Sonnenberg | ............... | 713/151 |
| 7,200,651 B1 * | 4/2007 | Niemi | ............... | 709/223 |
| 7,209,249 B2 | 4/2007 | Morita | | |
| 2005/0270990 A1 * | 12/2005 | Ukis | ............... | 370/254 |
| 2006/0026509 A1 * | 2/2006 | Porter | ............... | 715/520 |
| 2006/0031427 A1 * | 2/2006 | Jain et al. | ............... | 709/220 |
| 2006/0158675 A1 | 7/2006 | Morita | | |
| 2006/0164670 A1 | 7/2006 | Morita | | |
| 2008/0273461 A1 * | 11/2008 | Liang et al. | ............... | 370/235 |
| 2010/0287075 A1 * | 11/2010 | Herzog et al. | ............... | 705/30 |

FOREIGN PATENT DOCUMENTS

| | | |
|---|---|---|
| JP | 2001-202249 | 7/2001 |
| JP | 2002-84383 | 3/2002 |
| JP | 2003-283550 | 10/2003 |
| JP | 2004-178271 A | 6/2004 |
| JP | 2004-266805 | 9/2004 |

OTHER PUBLICATIONS

Japanese Office Action issued in Japanese Patent Application No. JP 2005-200033, dated Jul. 24, 2007.
Extended European Search Report issued in corresponding European Patent Application No. EP 06 25 3603, dated Sep. 29, 2006.

* cited by examiner

*Primary Examiner* — Robert W Wilson
*Assistant Examiner* — Mohamed Kamara
(74) *Attorney, Agent, or Firm* — Scully, Scott, Murphy & Presser, P.C.

(57) ABSTRACT

A network terminal device is configured to include a plurality of network applications that generate process instructions to cause devices on a network to execute processes, a storage unit that stores common network configuration information of the plurality of network applications, and a network terminal device where each of the plurality of network applications is capable of reading out the common network configuration information from the storage unit and reflecting the same in its own network configuration. Each application may transmit the process instructions to the device on the network based on the network configuration.

13 Claims, 15 Drawing Sheets

NETWORK TERMINAL DEVICE

CROSS-REFERENCE TO RELATED APPLICATION

This application claims priority under 35 U.S.C. §119 from Japanese Patent Application No. 2005-200033, filed on Jul. 8, 2005. The entire subject matter of the application is incorporated herein by reference.

TECHNICAL FIELD

The present invention relates to a network terminal device which generates process instructions to make a device on a network execute processes and transmits the instructions to the device.

BACKGROUND

Recently, as personal computer (hereinafter referred to "PC") usage has expanded drastically, networks such as a LAN are widely used. In such a network, besides terminals such as PCs, various devices such as printers and scanners are often connected to the network. Therefore, the terminals include various applications to make the devices function.

However, the various applications included in the terminals has own specific network configurations, respectively. For example, when a protocol to be used is changed, it is very laborious for a user to change the network configuration for each of the applications.

For example, currently, two kinds of protocols are used in the Internet. They are IPv4 (Internet Protocol Version 4) and IPv6 (Internet Protocol Version 6) which follows IPv4 to provide more addresses for networked devices. The number of addresses which IPv6 supports is very large, and each device can have its own address. By allotting an IP address to each device, IPv6 can eliminate the use of network address translation at transfer stations or setup operations of each device in the network when a network configuration is changed. However, in the current situation, IPv4 is still widely used, and most of the applications to operate devices connected to the network are configured to accommodate both IPv4 and IPv6. If IPv4 is changed to IPv6, or vice versa, network configurations all of the application have to be changed. These setups are very laborious for a user.

According to aspects of the invention, there is provided a network terminal device that includes a plurality of network applications that generate process instructions to cause devices to execute processes on a network, a storage unit that stores common network configuration information of the plurality of network applications, and a network terminal device. The plurality of network applications read out the common network configuration information from the storage unit and reflect it in their own network configurations, and the network terminal device transmits the process instructions to the device on the network based on the network configuration.

SUMMARY

An advantage of the invention is a network terminal device which can make a network configuration common to all network devices even if there are a plurality of applications to operate devices connected to the network.

DETAILED DESCRIPTION OF THE EMBODIMENT

General Overview

Figure 1:
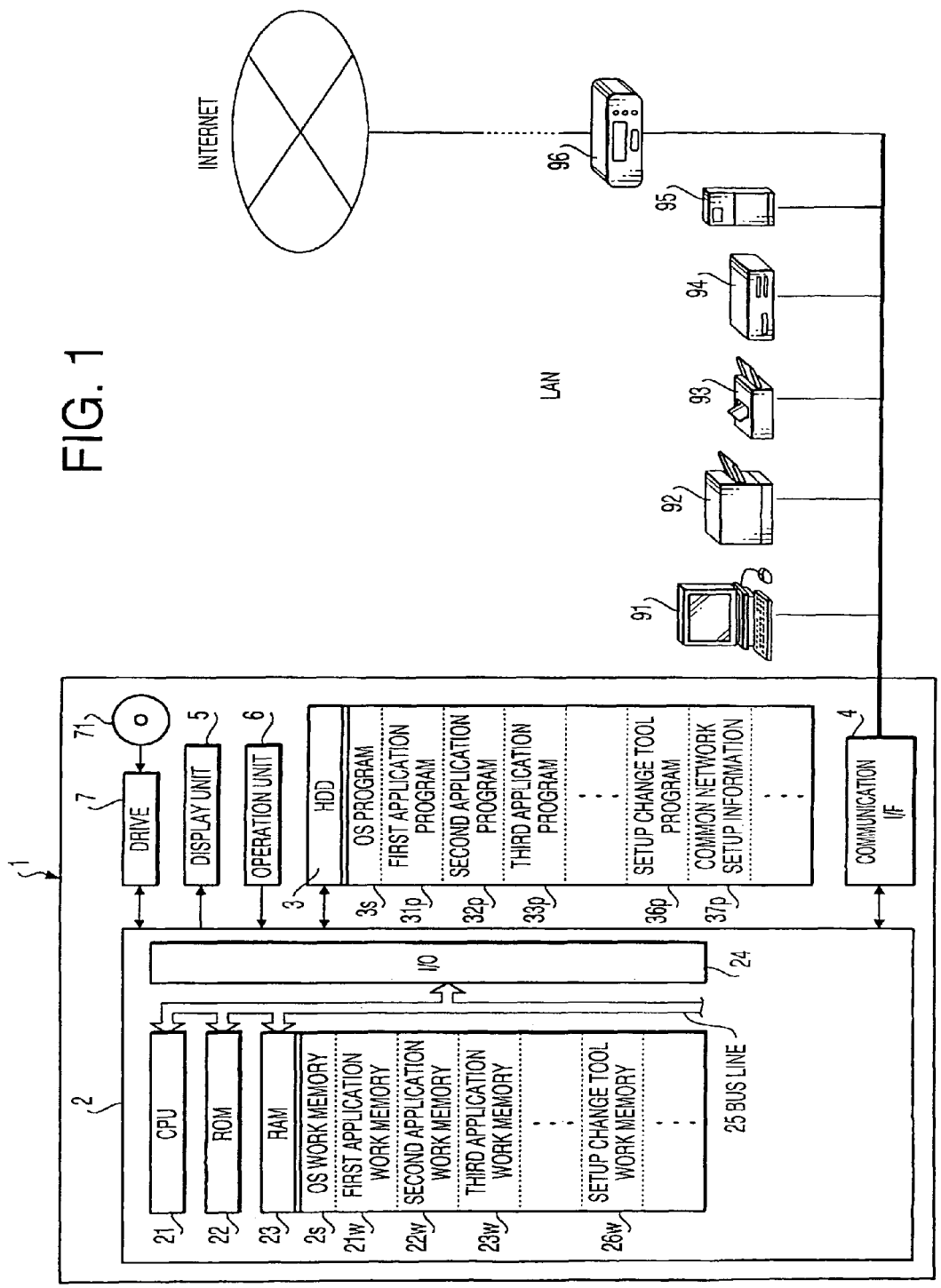
FIG. 1 is an electrical block diagram of a network terminal device according to aspects of the invention.

According to aspects of the invention, there is provided a network terminal device that includes a plurality of network applications that generate process instructions to cause devices to execute processes on a network, a storage unit that stores common network configuration information of the plurality of network applications, and a network terminal device, where the plurality of network applications read out the common network configuration information from the storage unit and reflect it in their own network configurations, and the network terminal device transmits the process instructions to the device on the network based on the network configuration.

According to aspects of the invention, by defining common network configuration information which is commonly used by the plurality of network applications, the network configuration can be made common to the devices without individual network configuration.

According to other aspects of the invention, the common network configuration information contains a setup of protocol selection or prioritization among a plurality of protocols. In accordance with aspects of the invention, it is easy to make the use protocol common to the devices. According to other aspects of the invention, the common network configuration information contains the configuration information of ancillary information of selected or prioritized protocol. In accordance with aspects of the invention, it is possible to make the details of the setups in selected protocol, etc. common to the devices.

According to aspects of the invention, there is provided a network terminal device where the network application transmits process instructions based on the network configuration usable by the application itself or the existing network configuration without reflecting the common network configuration information when the common network configuration information stored in the storage unit cannot be used by the application itself. In accordance with aspects of the invention, it is possible to avoid the situation where the network configuration cannot be used by the network application.

According to other aspects of the invention, the common network configuration information is stored in the storage unit rewritably, and the network terminal device is configured to include an operation unit into which update contents of the common network configuration information are input; and a setup change unit that updates the contents of the common network configuration information. In accordance with aspects of the invention, since the common network configuration information is updated with input from the operate unit, the user can make the network configuration common to the devices at one time by inputting the network configuration according to the object by the user himself without individual network configuration.

Further optionally, the common network configuration information is stored in the storage unit rewritably, and the network terminal device is configured to include an automatic setup change unit that acquires information related to network functions of the network terminal device or network functions of a device on the network, and updates the contents of the common network configuration information automatically responsive to the acquired information. In accordance with aspects of the invention, since the common network function is updated depending upon the function of the device itself or the function of the network on which the device exists, the network configuration can be made common to the devices at one time without the user's troublesome operation or individual network configuration.

According to aspects of the invention, there is provided an application program which causes a computer that functions as a network terminal device to execute a reflection procedure that reads out the common network configuration information from the storage unit and reflects the information in its own network configuration, and a transmission procedure that transmits the process instruction to the device on the network based on the network configuration, and a computer-readable medium having the application program stored thereon. In accordance with aspects of the invention, it is possible to make a network configuration common to the network application and other network applications using the common network configuration information.

According to aspects of the invention, there is provided an install program which causes a computer to execute a determine procedure that determines whether the common network configuration information is stored in the storage unit, and an install procedure without change to the network configuration when the common network configuration information is stored, and a computer-readable medium having the install program stored thereon. In accordance with aspects of the invention, when the common network configuration information is stored, by executing an installation procedure without change of the network configuration, it is possible to simplify the install process and to avoid the situation where the change of the network configuration has an unintended effect on other network application.

EMBODIMENTS

Figure 2:
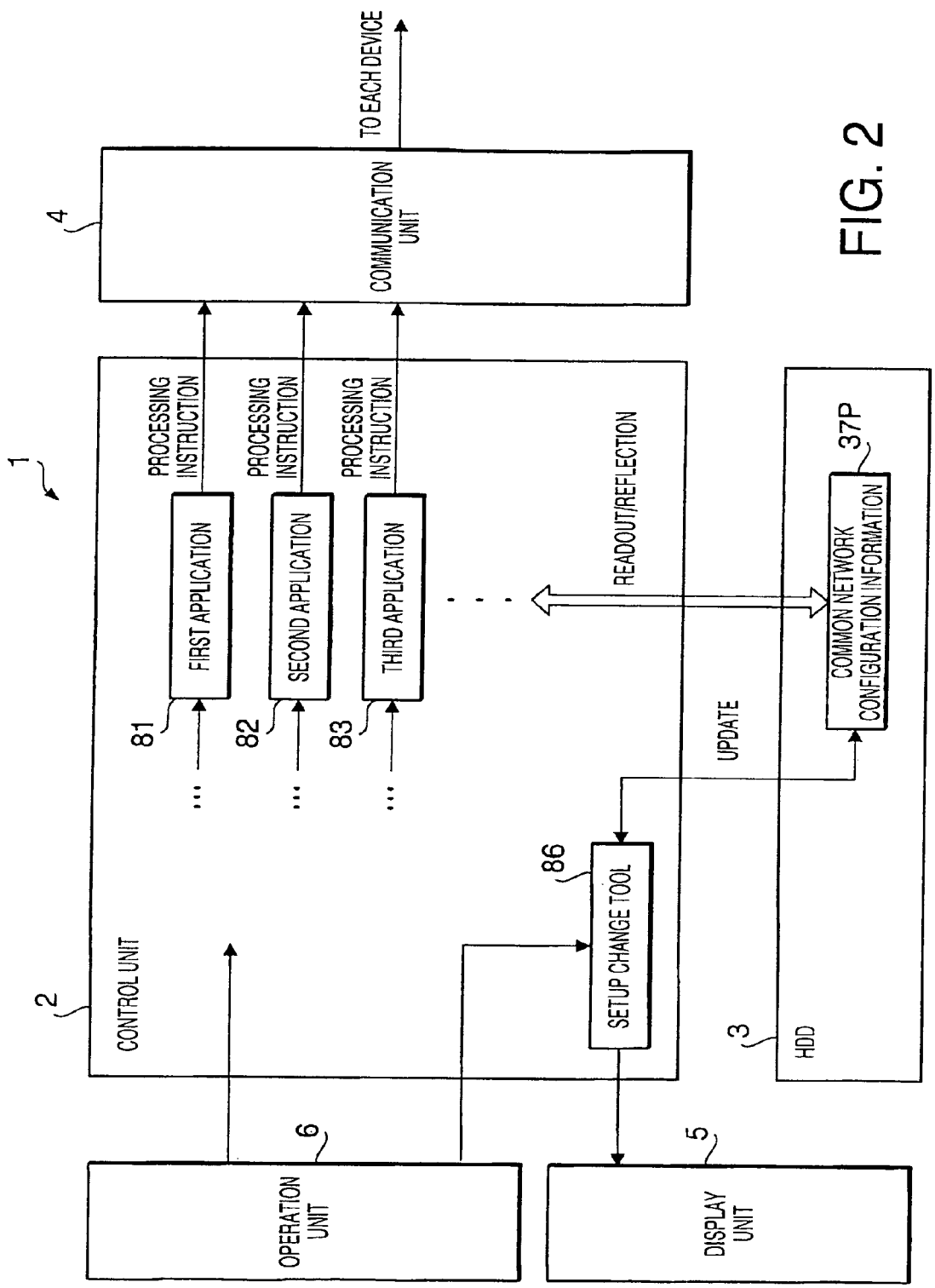
FIG. 2 is a functional block diagram of the network terminal device of FIG. 1.

Hereinafter, embodiments according to aspects of the invention will be described with reference to the accompanying drawings. FIG. 1 and FIG. 2 are an electrical block diagram and a functional block diagram of the network terminal device 1, respectively. The network terminal device 1 is connected to the LAN (Local Area Network) together with devices such as a PC 91, a printer 92, a facsimile 93, a scanner 94, a server 95, a router 96, as shown in FIG. 1. The network terminal device 1 can communicate with the other devices. Further, the network terminal device 1 can communicate with devices on the outside LAN or the Internet by a function of the router 96.

The network terminal device 1 includes a first application 81, a second application 82 and a third application 83 (network application) as can be seen in FIG. 2. The applications 81-83 generate process instructions and transmit the instructions to devices 91-96 on the LAN and make the devices execute processes. In the description below, only applications 81-83 are mentioned for convenience of explanation, but actually, more network applications can be included.

A HDD (Hard Disk Drive) device 3 (storage unit) stores common network configuration information 37p which is network configuration information common to the first application 81, the second application 82 and the third application 83. The first application 81, the second application 82 and the third application 83 read out the common network configuration information 37p, reflect the information to their own network configuration, and transmit process instructions.

The network terminal device 1 includes a setup change tool 86 (setup change unit) as shown in FIG. 2. The setup change tool 86 rewrites contents of the common network configuration information 37p stored the HDD device 3 based on an input from an operation unit 6 (operate unit).

Configuration and operation of the network terminal device 1 are described in detail below.

(1) Device Configuration

Device configuration of the network terminal is described. The network terminal device 1 is configured as a well-known personal computer (PC), and includes an HDD device 3, a communication I/F (Interface) 4, a display unit 5, an operation unit 6, a drive device 7, and a control unit 2 to which the devices are connected as can be seen in FIG. 1.

(1-1) HDD Device 3

The HDD device 3 stores, together with the common network configuration information 37p, an OS program 3s which functions as an operation system (OS) to operate the PC, a first application program 31p, a second application program 32p and a third application program 33p which function as the first application 81, the second application 82 and the third application 83 respectively, and a setup change tool program 36p which functions as the setup change tool 86.

The common network configuration information 37p stored in the HDD device 3 is network configuration information which is common to the first application 81, the second application 82 and the third application 83, and contains a setup of protocol selection or prioritization among a plurality of protocols. Specifically, the common network configuration information 37p contains the setup concerning to the Internet protocol (IP) whether IPv6 is used in the communication, or IPv6 is prioritized over IPv4 in the communication (see FIG. 13). The setup can get the above described merits of the IPv6 communication depending on the user's need.

The above network configuration is in the network layer of the OSI model. However, the network configuration is not limited to the network layer. The network configuration may contain setups in other layers. For example, concerning a transport layer, the network configuration may contain a setup wherein protocol is prioritized among TCP (Transmission Control Protocol), UDP (User Datagram Protocol), etc. In the network configuration, TCP communication which can provide reliable data transmission or UDP communication which can reduce network traffic load can be selected depending upon the situation. Concerning an application layer, the network configuration may contain a setup wherein protocol is prioritized among HTTP (Hyper Text Transfer Protocol), FTP (File Transfer Protocol), SNMP (Simple Network Management Protocol), etc. (see FIG. 14). When a priority order is determined in this way, even if processes are executed to achieve the same object, priority items can be timely changed depending upon communication contents as existence of error correction and process speed are different according to each protocol.

Figure 15:
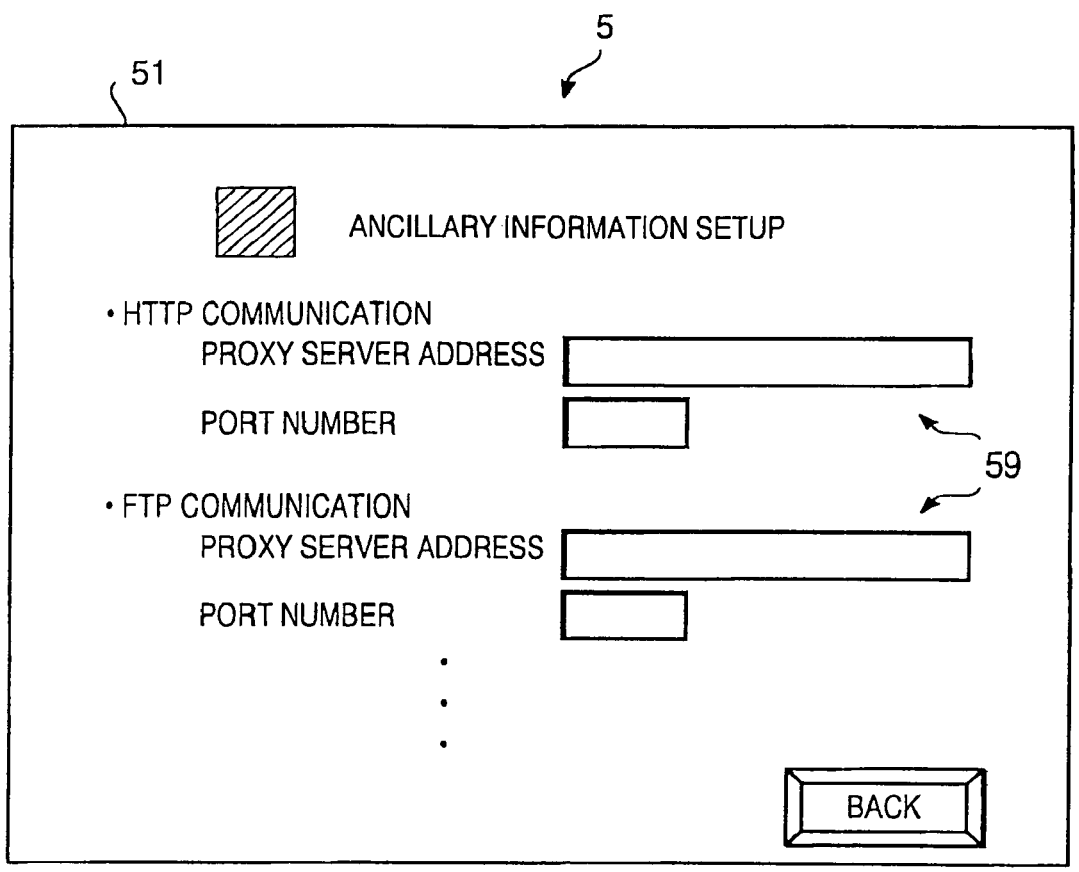
FIG. 15 shows a third display example of the display device at the time of the setup change process.

The common network configuration information 37*p* may include ancillary information of the protocol selected or prioritized in the above description. For example, the network configuration may contain a setup wherein a proxy server is used when the communication is executed using HTTP or FTP (see FIG. 15), or the mail server address and the time-out value in the case SMTP (Simple Mail Transfer Protocol) is used.

Figure 16:
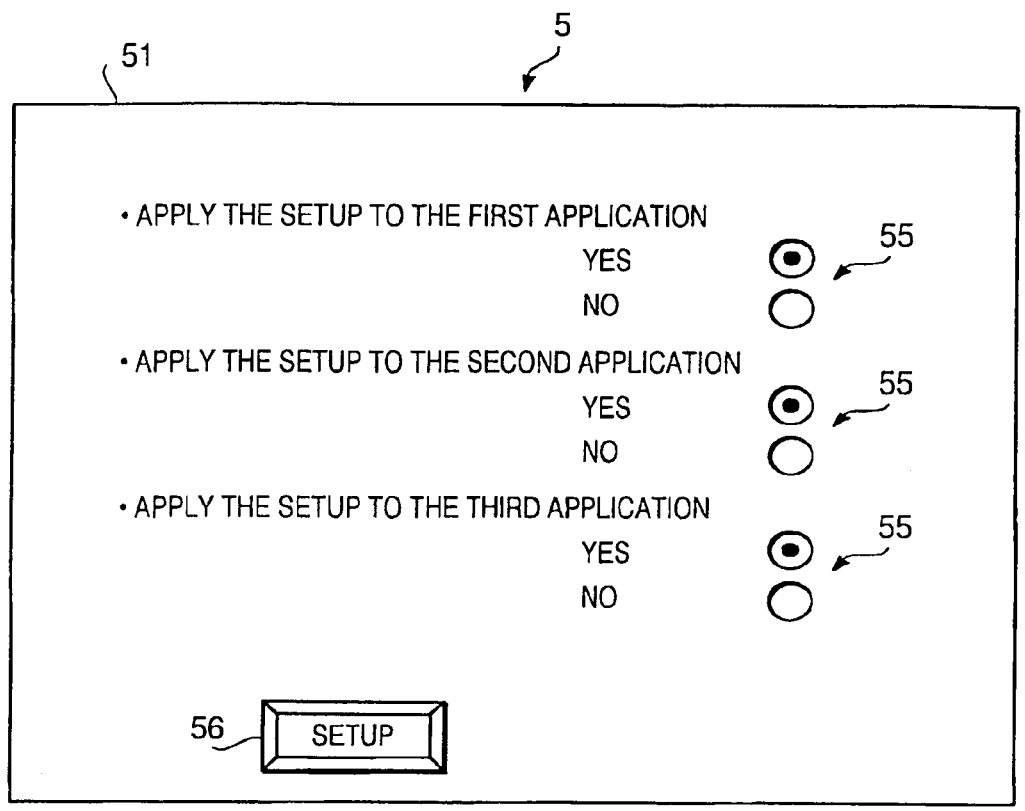
FIG. 16 shows a fourth display example of the display device at the time of the setup change process.

Further, the common network configuration information 37*p* may contain a setup to determine which network configuration is to be applied to which application (see FIG. 16). Thus, while the used network configuration can be commonized, an application to which the network configuration is applied is chosen according to need.

(1-2) Communication I/F 4

The communication I/F 4 includes a network card that has an interface function with a LAN. The communication I/F 4 enables the device to communicate with the PC 91, the printer 92, the facsimile 93, the scanner 94, the server 95, the router 96, and further with devices on the outside LAN or the Internet.

(1-3) Display Unit 5

The display unit 5 comprises a display unit such as a liquid crystal display or a CRT display, and provides GUI (Graphical User Interface) together with an operation unit 6. In a setup change process of the common network configuration information 37*p* which is described later (see FIG. 5), setup change item fields of the common network configuration information 37*p*, etc. are displayed on a display screen 51 as shown in FIGS. 13-16.

(1-4) Operation Unit 6

The operation unit 6 comprises an operation unit such as a pointing device (mouse, etc.) and a keyboard, and provides a GUI (Graphical User Interface) together with the display unit 5. By operating the operation unit 6, update contents of common network configuration information 37*p* are input to the setup change item fields 57, etc. displayed on the display screen 51.

(1-5) Drive Device 7

The drive device 7 is a device to input various data from the recording medium 7 such as a CD-ROM, a DVD-ROM and a memory card. In addition, a record medium 71A (for example CD-ROM, see FIG. 17) that stores an install program 72, which is described later, is also read with the drive device 7.

(1-6) Control Unit 2

The control unit 2 is configured with an ordinary computer and includes a CPU 21, a ROM 22, a RAM 23, an input/output interface (I/O) 24 and a bus line that connects these units. The CPU 21 controls processes based on the OS program 3*s*, the first application program 31*p*, the second application program 32*p*, the third application program 33*p* and the setup change tool program 36*p* stored in the HDD device 3. The OS program 3*s* operates on an OS work memory in the RAM 23. The first application program 31*p*, the second application program 32*p*, the third application program 33*p* and the setup change tool program 36*p* operate on a first application work memory 21*w*, a second application work memory 22*w*, a third application work memory 23*w* and a setup change tool work memory 26*w* in the RAM 23, respectively. Thus, the control unit 2 functions as the first application 81, the second application 82, the third application 83 and the setup change tool 86 as shown in FIG. 2.

(1-7) Devices 91-96

Devices connected to the LAN (the PC 91, a printer 92, the facsimile 93, the scanner 94, a server 95 and a router 96) and devices on the outside LAN or on the Internet are configured with computers (CPUs, ROMs, RAMs, etc.) and communication I/Fs (not shown) respectively. The devices can execute processes of their own functions and can transmit and receive data via the network.

(2) Device Operation

Figure 3A:
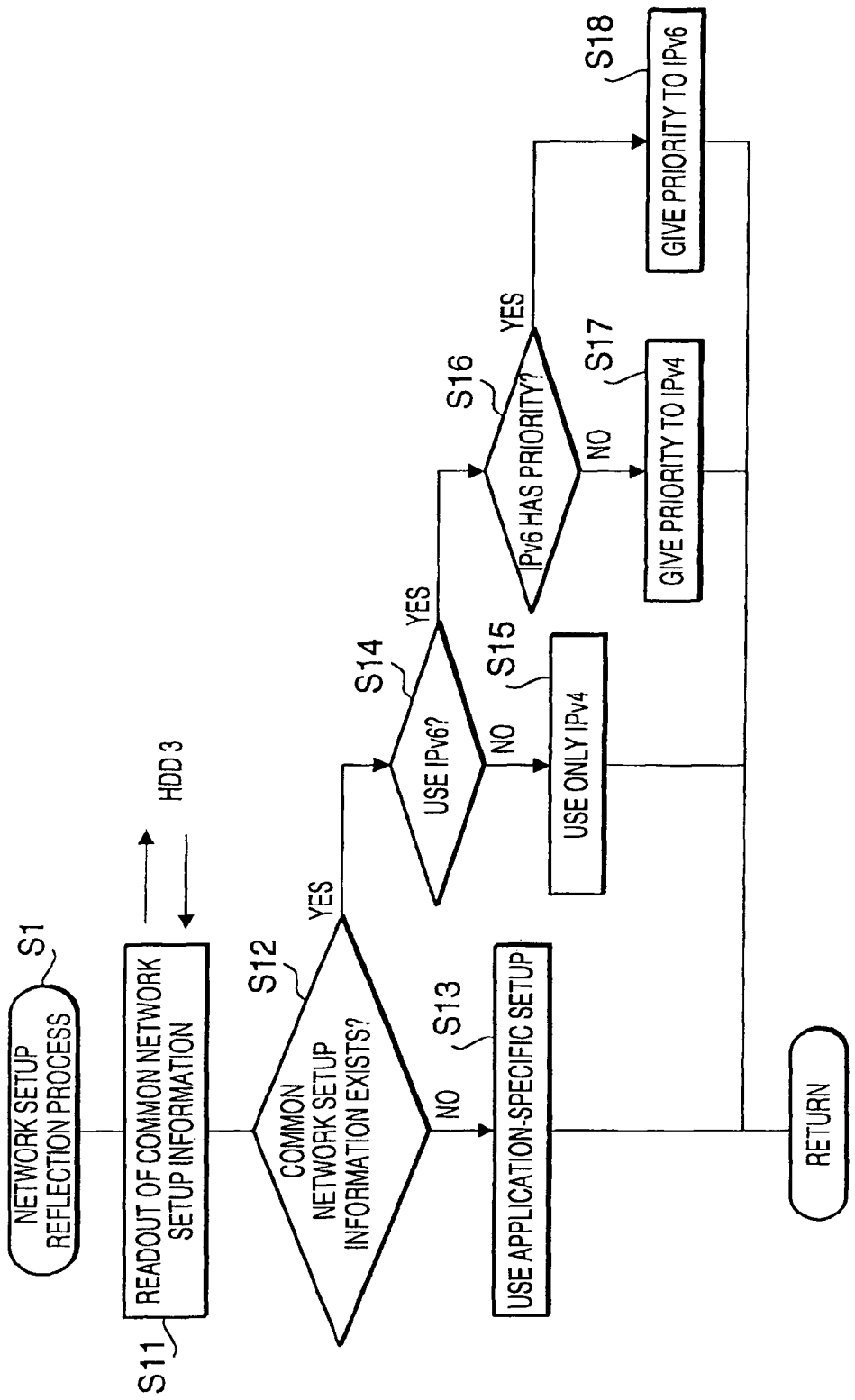
FIGS. 3A, 3B and 3C are flow diagrams which show the network configuration reflection process (the first example) which is executed by the network terminal device.
Figure 3B:
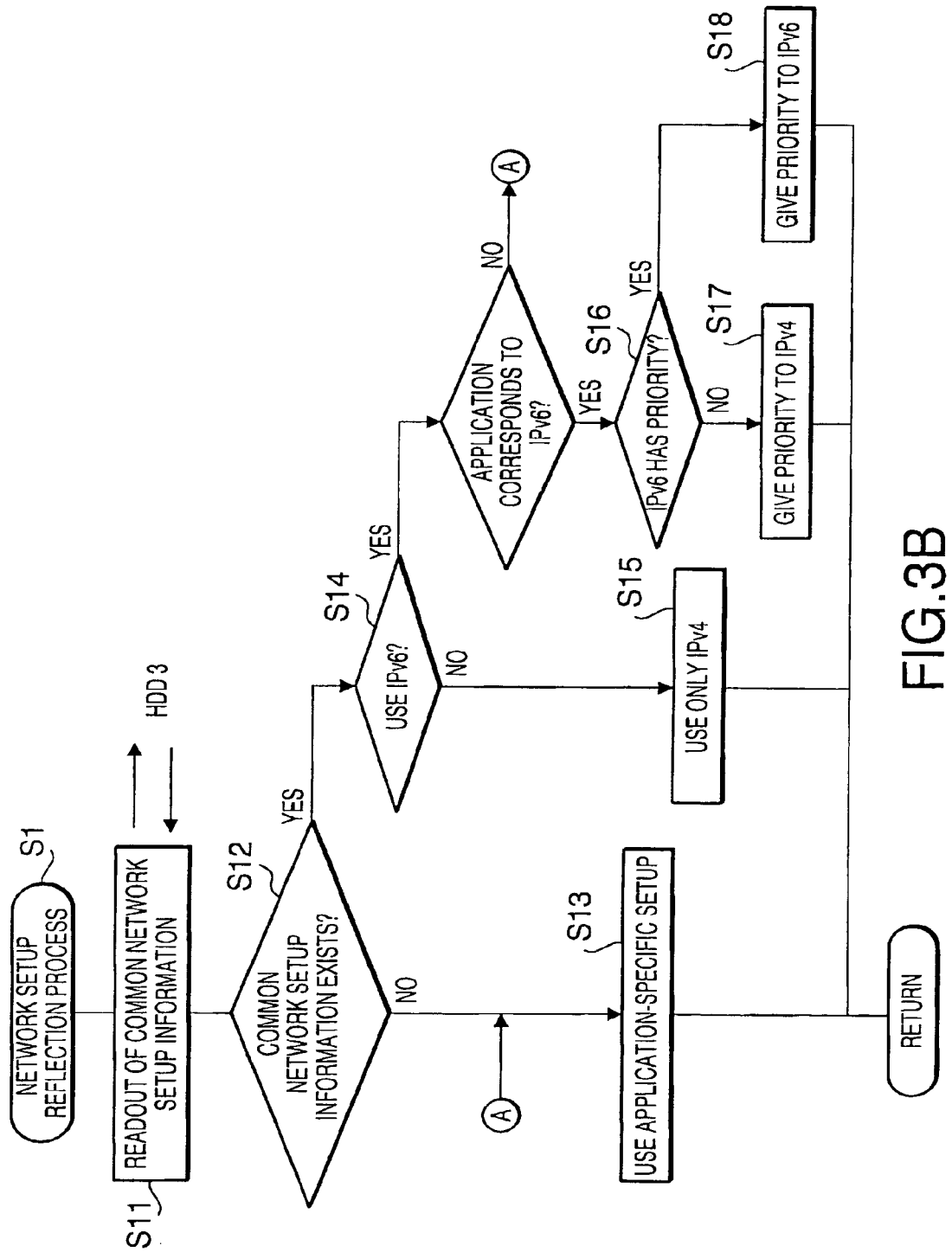
Figure 3C:
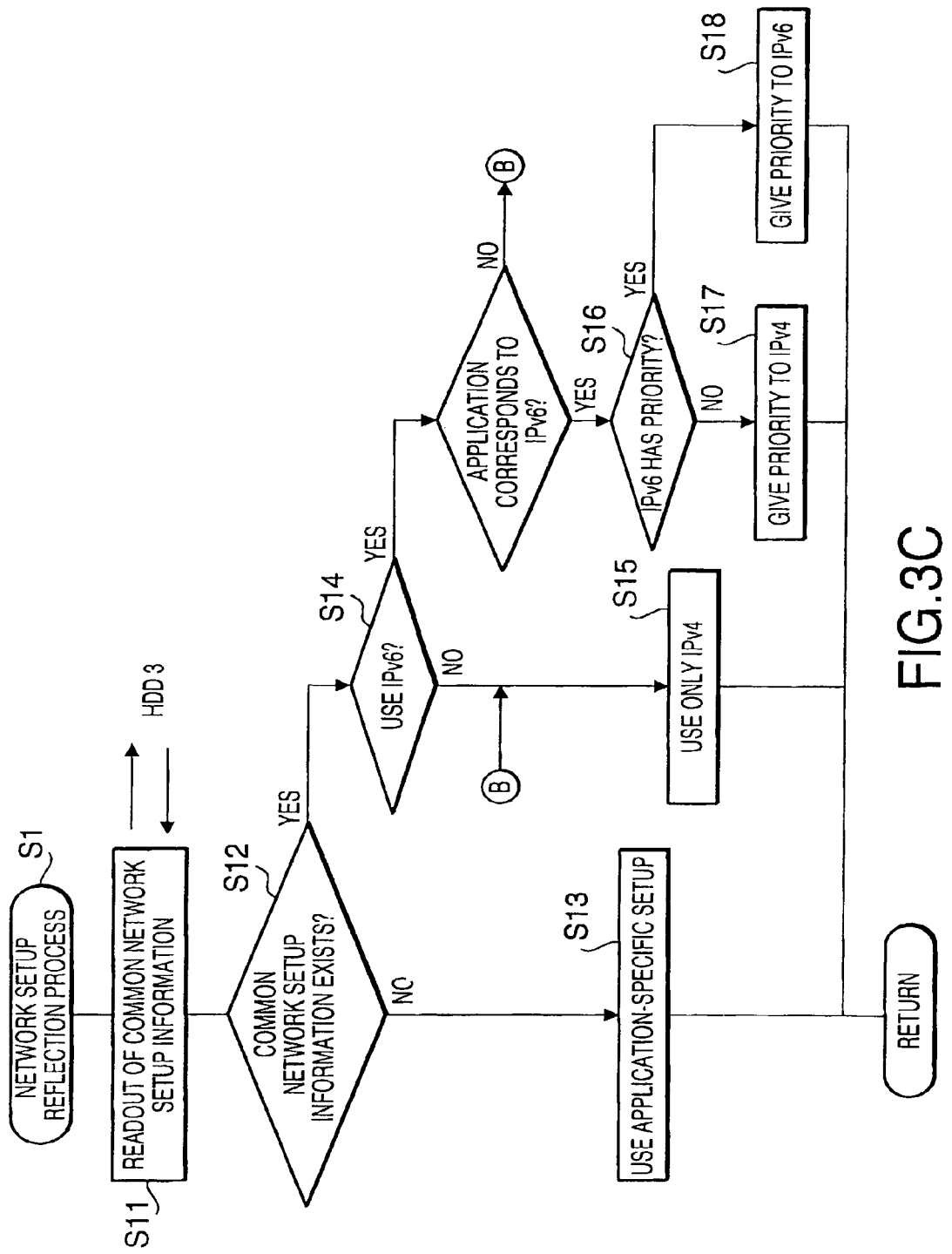
Figure 4:
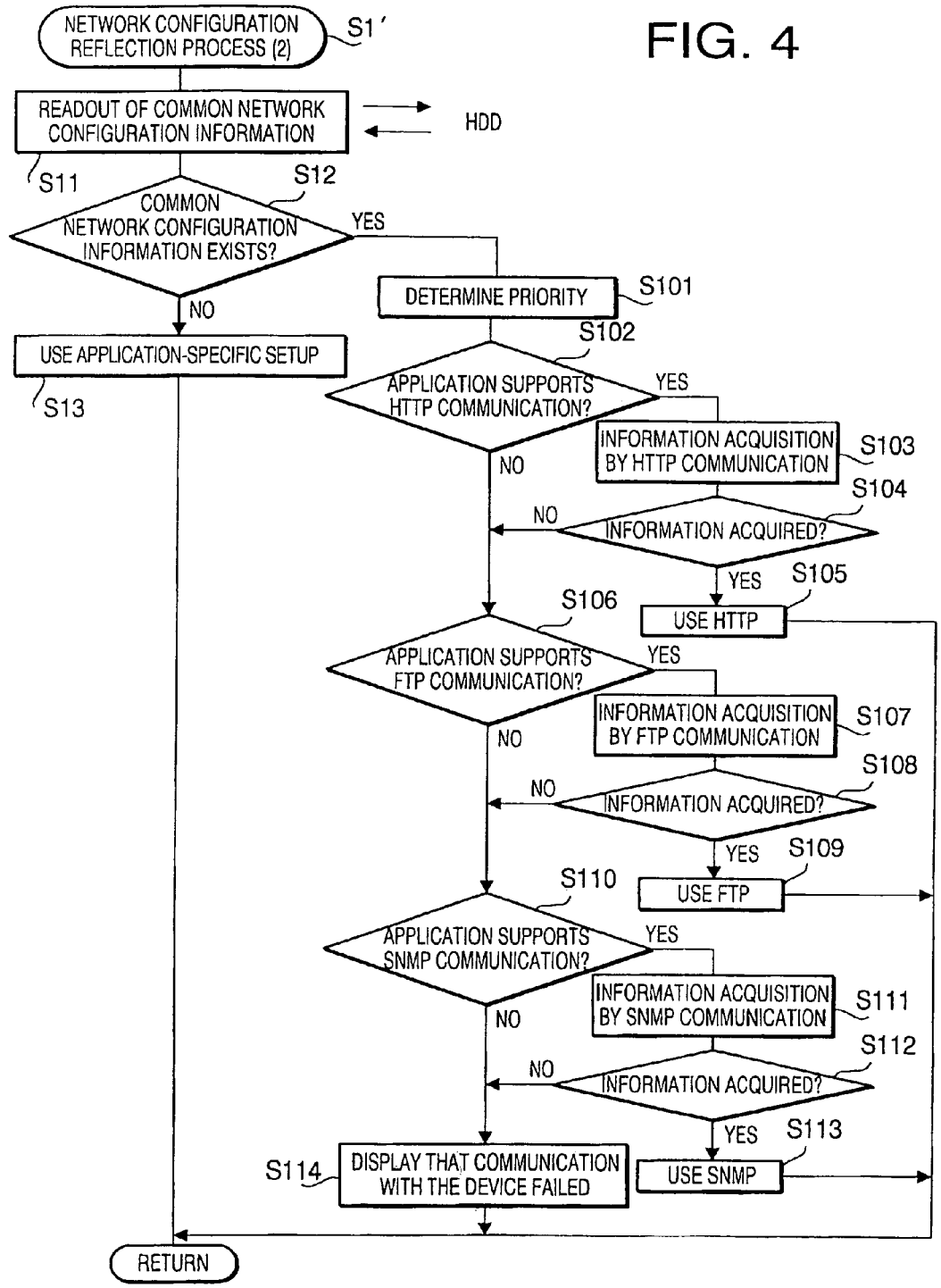
FIG. 4 is a flow diagram which shows the network configuration reflection process (the second example) which is executed by the network terminal device of FIG. 1.
Figure 5:
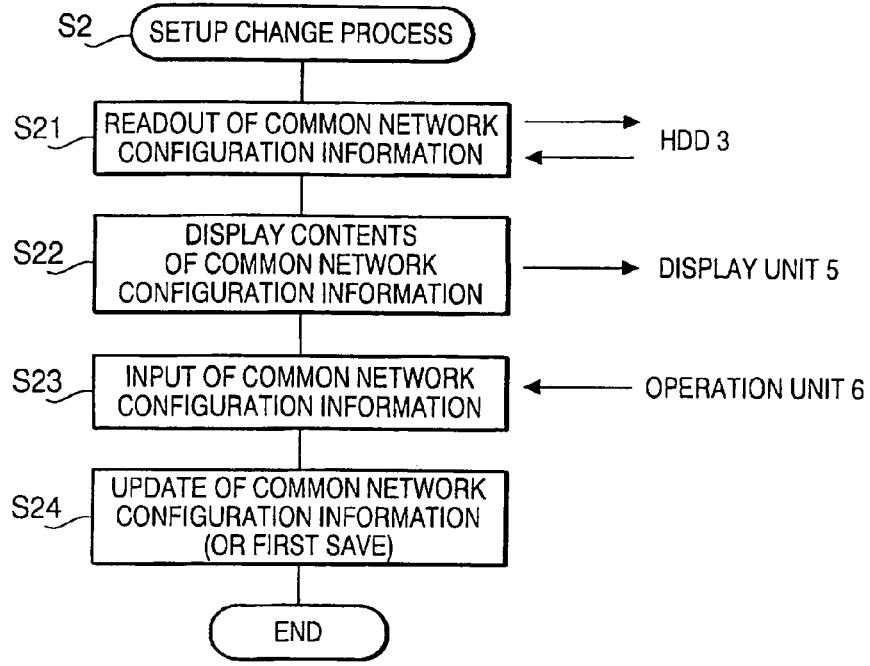
FIG. 5 is a flow diagram which shows the setup change process which is executed by the network terminal device of FIG. 1.

Operations of the network terminal device 1 are described referring to FIGS. 2-12. FIGS. 3 and 4 are flow diagrams which show a network configuration reflection process contained in first application program 31*p*, second application program 32*p* and third application program 33*p*, which the CPU 21 of the control unit 2 executes. FIG. 5 is a flow diagram which shows a process contained in setup change tool program 36*p* that the CPU 21 also executes. FIG. 2 is a function block diagram which shows the above processes. The control unit 2 has the functions of the first application 81, the second application 82 and the third application 83 (network application) and the setup change tool 86, which are realized by the CPU 21's execution.

(2-1) Network Configuration Reflection Process

Firstly, a network configuration reflection process S1 shown in FIG. 3A is described. The process is carried out when the common network configuration information 37*p* contains a setup whether IPv6 is used in the communication or IPv6 is prioritized over IPv4 in the communication. When the network applications (hereinafter, referred to simply "applications") receive commands from the operation unit 6 or upper level applications, the applications boot the network configuration reflection process S, and execute a process to reflect the network configuration in the common network configuration information 37*p*.

Specifically, in the network configuration reflection process S1, the application reads out the common network configuration information 37*p* stored in the HDD device 3 (S11), and determines whether the common network configuration information 3*p* exists (S12). If the common network configuration information 37*p* exists (S12: Yes), it is determined whether IPv6 is set up to be used (S14) or IPv6 is set to be prioritized (S16). The network configuration is reflected depending upon the setup; that is, only IPv4 is used (S15), IPv4 is prioritized (S17), or IPv6 is prioritized (S18). On the other hand, if the common network configuration information 37*p* does not exist (S12: No), an existing network configuration of the application is used (S3).

After reflecting the setup, the application transmits process instructions to the corresponding devices 91-96. The transmission is executed through the communication I/F 4 (network card) specifically from a communication software (for example, TCP/IP software: communication unit) of the OS operating according to commands from the application.

If the contents of the common network configuration information 37p cannot used by the application itself, the application may transmit process instructions based on the usable network configuration of the application itself or the existing network configuration without reflecting the common network configuration information. Specifically, in the flow diagram of FIG. 3A, a step where it is determined that the application itself corresponds to IPv6 is placed just before the process S16 (see FIGS. 3B and 3C). In a process flow shown in FIG. 3B, if the application does not correspond to IPv6, the CPU 21 goes to S13 where only the existing setup is used. In a process flow shown in FIG. 3C, if the application does not correspond to IPv6, the CPU goes to S15 where only IPv4 is used. These process configurations avoid the situation where the network configuration setting IPv6 to be used which cannot be used by the application.

Next, as a variation of the network configuration reflection process S1, a network configuration reflection process S1' shown in FIG. 4 is described. The process is carried out when the common network configuration information 37p contains a setup whose protocol is prioritized among HTTP, FTP and SNMP. A step which is the same as a step in the network configuration reflection process S1 has the same reference number.

In the network configuration reflection process S1', if it is determined that the common network configuration information 37p exists (S12: Yes), the application determines priority order among HTTP, FTP and SNMP in the common network configuration information 37p (S101). Hereinafter, a process in the case where the priority-order is "HTTP>FTP>SNMP" is described. Firstly, the application determines whether HTTP communication is supported (S102). IF HTTP communication is supported (S102: Yes), the application communicates with the corresponding device 91-96 (S103). If information is acquired (S104: Yes), the setup is set to use HTTP communication (S105). On the other hand, if HTTP communication is not supported (S102: No) or information is not acquired (S104: No), it is determined whether FTP communication is supported (S106), a similar process to the process described above is executed (S106-S109). If FTP communication is not supported (S106: No) or information is not acquired (S108: No), it is determined whether SNMP communication is supported (S110), similar processes are executed (S110-S113). Then if SNMP communication is not supported (S110: No) or information is not acquired (S112: No), a message that communication with the device 91-96 failed is displayed on the display screen 51 of the display unit 5 (S114). In the processes in S102-S114, according to the priority order, it is determined whether it is possible to communicate using HTTP, FTP or SNMP in this order. The priority order may be different from the above order.

If the common network configuration information 37p contains setups of ancillary information of the protocol, the application may reflects the setups of the ancillary information together with the protocol. For example, if the common network configuration information 37p contains a setup which determines the specific proxy server used when HTTP or FTP is used as a setup of ancillary information (see FIG. 15), besides the step S105 where the setup is set to use HTTP communication and the setup 109 where the setup is set to use FTP communication, a step where setup is set to use the specific proxy server through which the communication is executed is placed in the flow diagram of FIG. 4.

The above described network configuration reflection process S1 shown in FIG. 3A is carried out when the common network configuration information 37p contains a setup according to the protocol in the network layer (IPv6 is used or IPv6 is prioritized over IPv4). On the other hand, the above described network configuration reflection process S1' shown in FIG. 4 is carried out when the common network configuration information 37p contains a setup according to the protocol in the application layer (which protocol is prioritized among HTTP, FTP and SNMP). The common network configuration information 37p may contain both of the setups. In that case, the network configuration reflection process may be an integral process of the network configuration reflection process S1 and the network configuration reflection process S1'. Specifically, in the network configuration reflection process S1 of FIG. 3A, processes in S101-S114 of the network configuration reflection process S1' are placed just before "RETURN".

(2-2) Network Application Example

Each of the first application 81, the second application 82 and the third application 83 (network application) contains the above described network configuration reflection process, reads out the common network configuration information 37p, reflects the information to the own network configuration based on the network configuration, and transmits process instructions to the corresponding devices 91-96 on the network. Hereinafter, examples of the network application are described.

Figure 8:
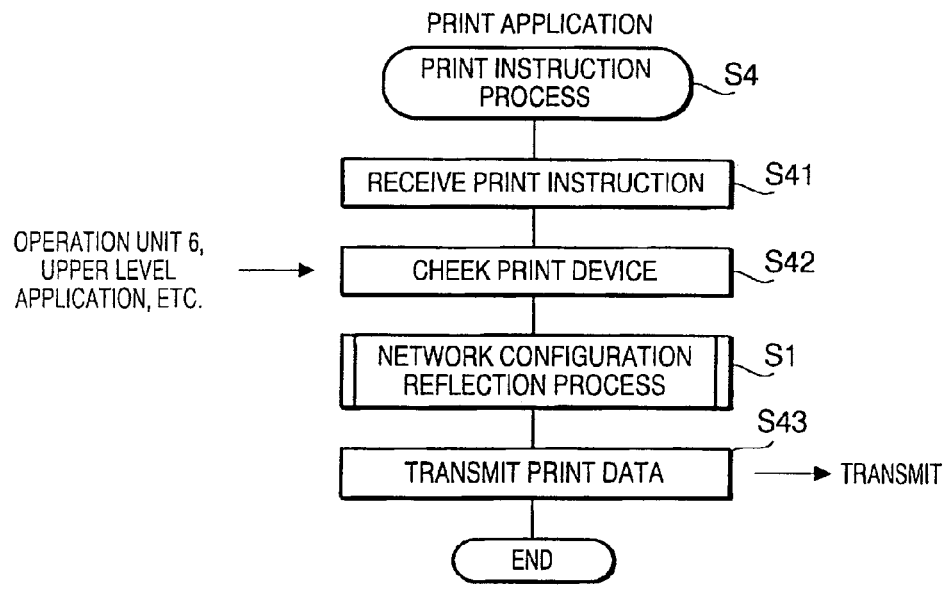
FIG. 8 is a flow diagram which shows a first example (printing process) which is executed by the network terminal device of FIG. 1 to a device connected to the network.

The first example of the network application is a print application which generates process instructions to make the printer (printing device) 92 on the LAN execute a printing process, and transmits the instructions to the printer 92. A flow diagram of the print instruction process S4 of the print application is shown in FIG. 8. When the print application receives commands from the operation unit 6 or upper level applications (S41), firstly, the application confirms that the printer 92 to which the print data is transmitted is properly connected to network terminal device 1 (S42). Next, the application executes the above described network configuration reflection process S1 (or S1', etc.), and reflects the common network configuration information 37p to the own network configuration. Thereafter, based on the reflected network configuration, the application transmits print data (process instructions) to the printer 92 (S43). Then, the printer 92 received the data executes the printing process.

Figure 9:
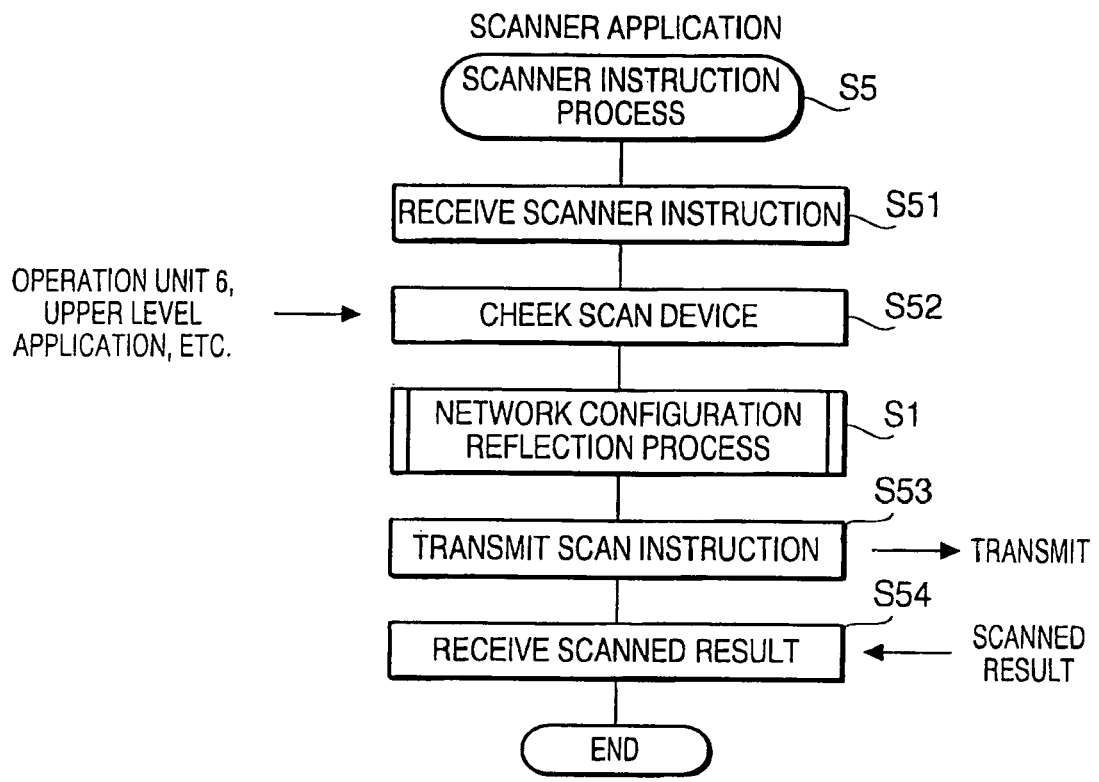
FIG. 9 is a flow diagram which shows a second example (scanner process) which is executed by the network terminal device of FIG. 1 to the device connected to the network.

The second example of the network application is a scanner application which generates process instructions to make the scanner (scanning device) 94 on the LAN execute a scanning process, transmits the instructions to the scanner 94, and receives a scanning result (reading result) from the scanner 94. A flow diagram of the scanner instruction process S4 of the scanner application is shown in FIG. 9. When the scanner application receives commands from the operation unit 6 or upper level applications (S51), firstly, the application confirms that the scanner 94 from which scanning data is received is properly connected to the network terminal device 1 (S52). Next, the application executes the above described network configuration reflection process S1 (or S1', etc.), and reflects the common network configuration information 37p to the own network configuration. Thereafter, based on the reflected network configuration, the application transmits a scan instruction (process instructions) to the scanner 94 (S53). The scanner 94 executes a scan process, and returns a scan result. When the scanner application receives the scan result (S54), the scanner application executes a process to transmit the result to the upper level application, and processes to display the result on the display screen 51 of the display unit 5, etc.

Figure 10:
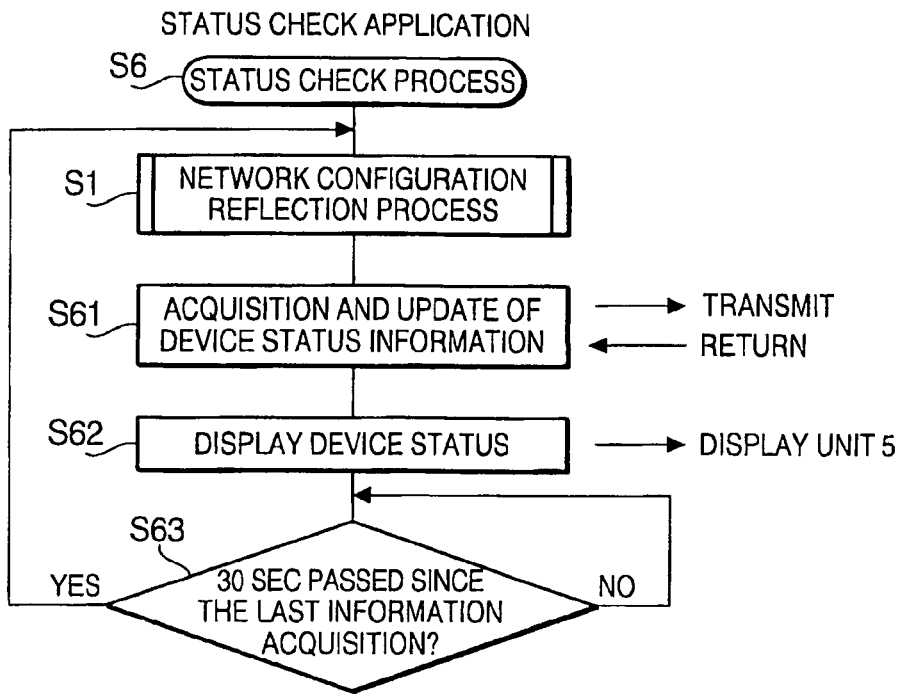
FIG. 10 is a flow diagram which shows a third example (status check process) which is executed by the network terminal device of FIG. 1 to the device connected to the network.

The third example of the network application is a status check application which generates process instructions to make the devices 91-96 on the LAN return their own status information, transmits the instruction to the device 91-96, and by receiving the replies, obtains the status information of the devices 91-96. A flow diagram of the status check process S6 of the status check application is shown in FIG. 10. Firstly, the status check application executes the above described network configuration reflection process S1 (or S1', etc.), and reflects the common network configuration information 37*p* to its own network configuration. Next, based on the reflected network configuration, the application transmits process instructions to make the devices 91-96 return their status information (S61). The devices 91-96 which receives the instructions returns their own status information (READY status, SLEEP status, etc.) together with a machine type, a model name, IP address, MAC address, etc. Then, when the status check application receives the information, the application displays the status information of the device 91-96 on the display screen 51 of the display unit 5 (S62). Thereafter, if a predetermined time has passed (S63: Yes), the application returns back to the network configuration reflection process S1, and repeats the above processes.

Figure 11:
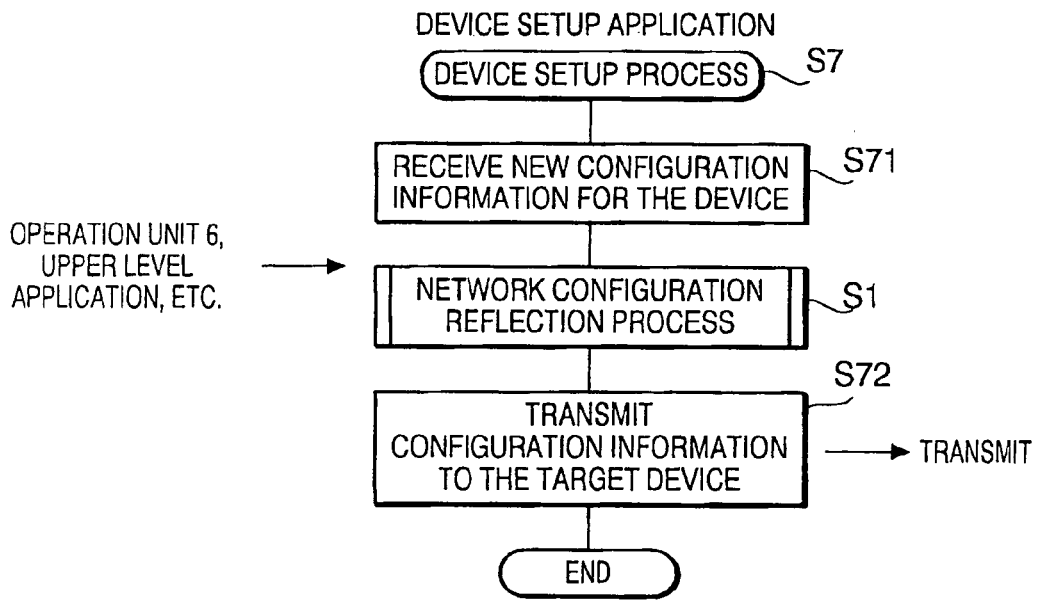
FIG. 11 is a flow diagram which shows the fourth example (device setup process) which is executed by the network terminal device to the device connected to the network.

The fourth example of the network application is a device setup application which generates process instructions to make the devices 91-95 change their configuration information and transmits the instructions to the devices 91-96. A flow diagram of the device setup process S7 of the device setup application is shown in FIG. 11. When the device setup application receives commands from the operation unit 6 or upper level applications (S71), firstly, the application executes the above described network configuration reflection process S1 (or S1', etc.), and reflects the common network configuration information 37*p* to its own network configuration. Next, based on the reflected network configuration, the application transmits process instructions to make the devices 91-96 return their status information (S71). Then, the devices 91-96 which receive the instructions execute a process to change their own configuration information (for example, print setup of the printer 92, port opening/closing setup of the router 96, etc.).

Figure 12:
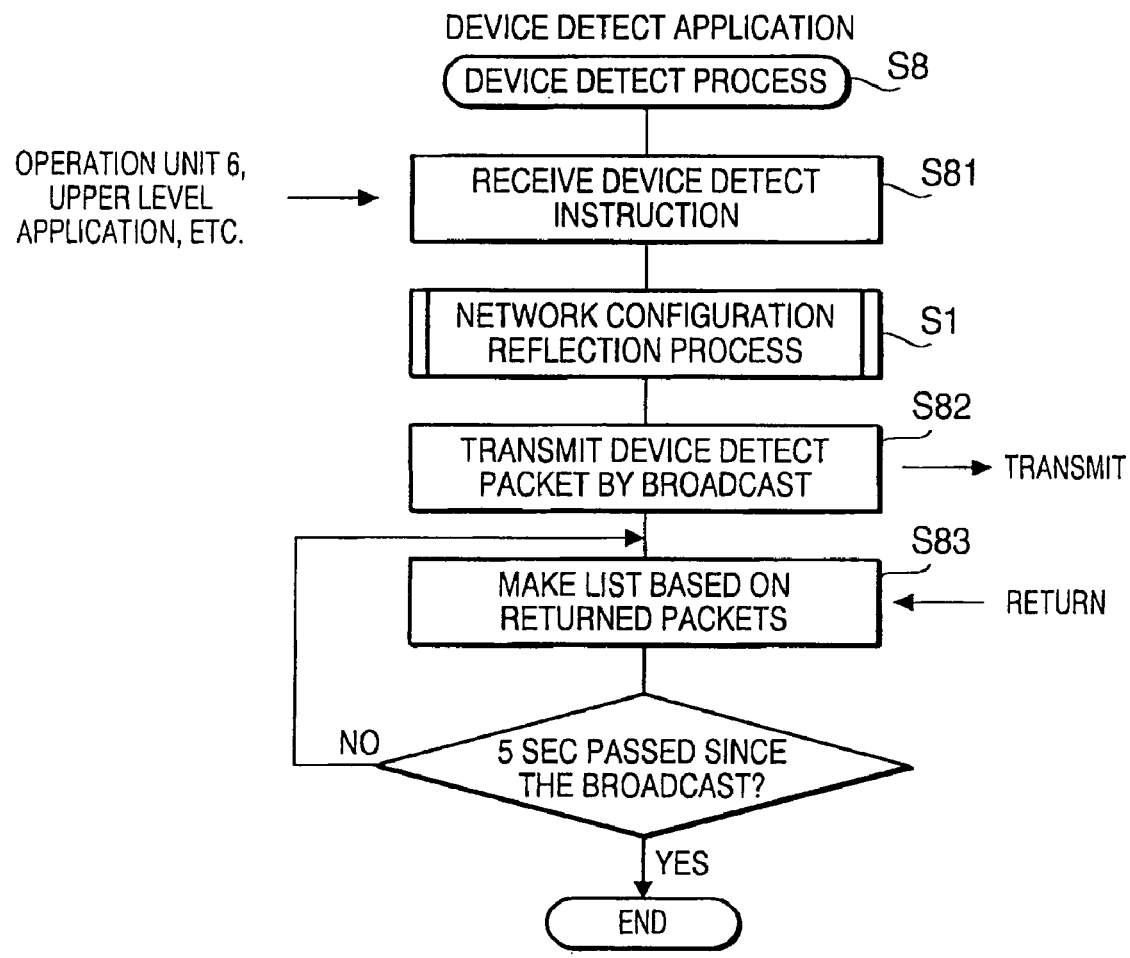
FIG. 12 is a flow diagram which shows the fifth example (device detect process) which is executed by the network terminal device to the device connected to the network.

The fifth example of the network application is a device detect application which generates process instructions to make an unspecified devices 91-96 on the LAN send a reply, transmits (broadcasts) the instructions to the devices 91-96, printer 92, and by receiving the replies, detects existing devices 91-96 on the LAN. A flow diagram of the device detect process S8 of the device detect application is shown in FIG. 12. When the device detect application receives commands from the operation unit 6 or upper level applications (S81), firstly, the application executes the above described network configuration reflection process S1 (or S1', etc.), and reflects the common network configuration information 37*p* to its own network configuration. Then, based on the reflected network configuration, packets for device detection are transmitted by broadcast (S82). The devices 91-96 which receive the instructions return their status information (READY status, SLEEP status, etc.) together with a machine type, a model name, IP address, MAC address, etc. Then, the device detect application makes a list of the detected devices 91-96 (S83, S84).

(2-3) Common Network Configuration Information Update

Contents of the common network configuration information 37*p* stored in the HDD device 3 is updated by the setup change tool 86 (see FIG. 2). A flow diagram of the setup change process S2 executed by the setup change tool 86 is shown in FIG. 5. The setup change tool 86 reads out the common network configuration information 37*p* from the HDD device 3 (S21), then displays the contents of the configuration information on the display screen 51 of the display unit 5 (S22). When the user confirms the display and inputs update contents (or new contents) of the common network configuration information 37*p* with the operation unit 6 (S23), the common network configuration information 37*p* is updated (or newly saved) using the input contents (S24).

Figure 13:
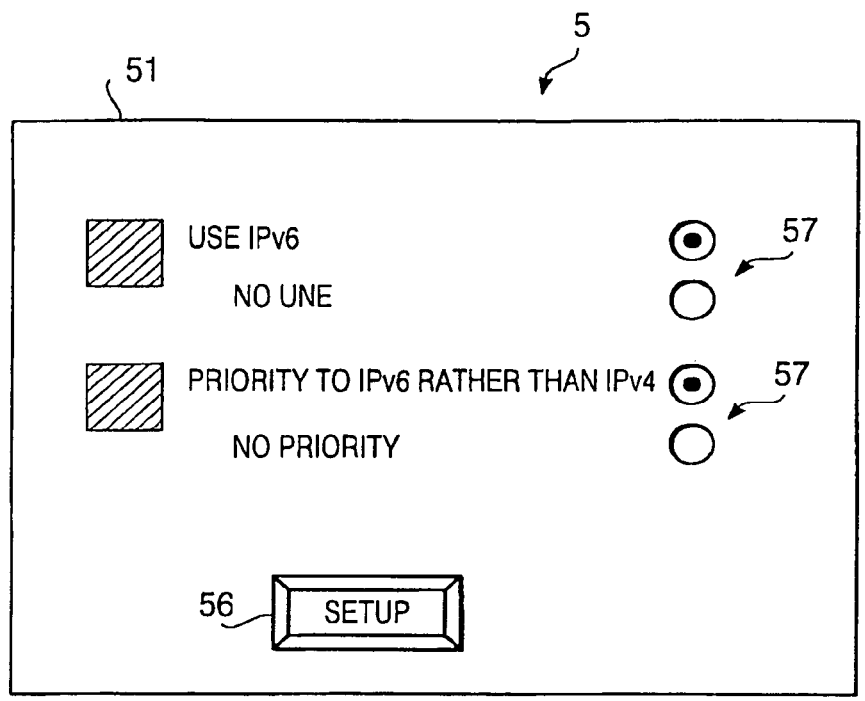
FIG. 13 shows a first display example of a display device at the time of the setup change process.
Figure 14:
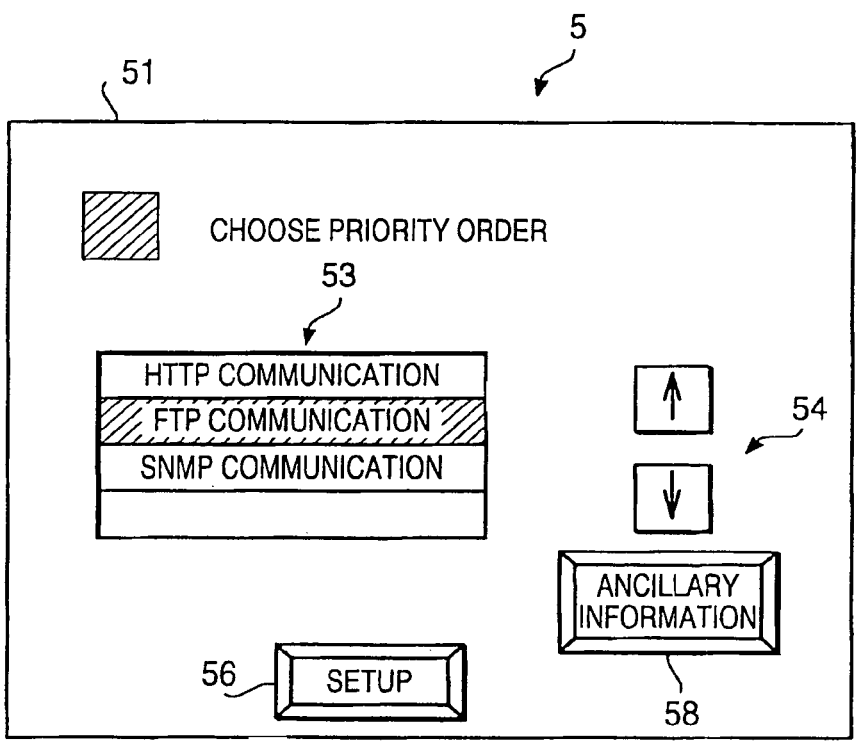
FIG. 14 shows a second display example of the display device at the time of the setup change process.

Display examples on the display screen 51 in S22 are shown in FIGS. 13-16. FIG. 13 shows the display screen 51 in the case where the common network configuration information 37*p* contains a setup of the protocol of the network layer. Setup change item fields 57 indicating whether IPv6 is used and whether IPv6 is prioritized over IPv4, and a setup update button 56 to reflect the change, are placed on the display screen 51. FIG. 14 shows the display screen 51 in the case where the common network configuration information 37*p* contains a setup of the protocol of the application layer. Priority display fields 53 indicating which protocol is prioritized among HTTP, FTP and SNMP, up and down buttons 54 with which the priority among selected items is changed, and a setup update button 56 to reflect the priority setup, are placed on the display screen 51. An ancillary information setup button 58 is also placed. The ancillary information setup button 58 has a link to the ancillary information setup screen shown in FIG. 15. In the ancillary information setup screen, ancillary information of the protocol can be set up. Specifically, in the case that HTTP or FTP is used, setup write-in fields 59 designate which proxy server is used to communicate.

The common network configuration information 37*p* can contain a setup indicating which application the above described network configuration is applied to. In this case, applied item fields 55 indicating which application the network configuration is applied to are placed on the display screen 51 as shown in FIG. 16. In this case, a step where it is determined whether the application applies the network configuration to itself is executed by the network application after reading out the common network configuration information 37*p* in the network configuration reflection process shown in FIG. 3A and FIG. 4, etc. The network application can be configured such that its existing setup is used, if the setup cannot be applied.

Figure 6:
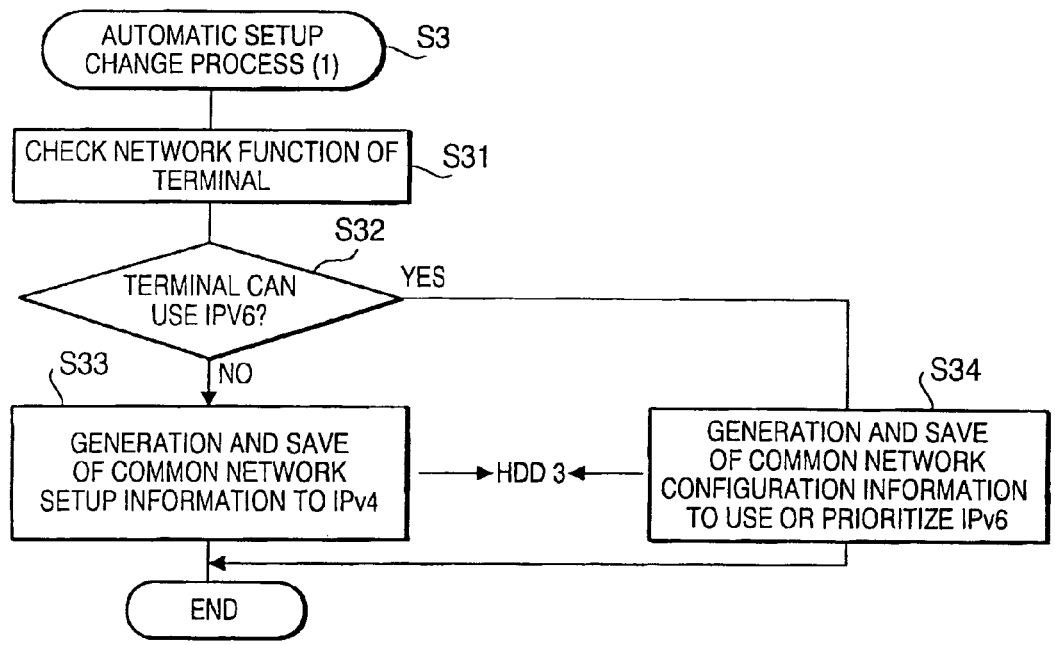
FIG. 6 is a flow diagram which shows the automatic setup change process (the first example) which is executed by the network terminal device of FIG. 1.
Figure 7:
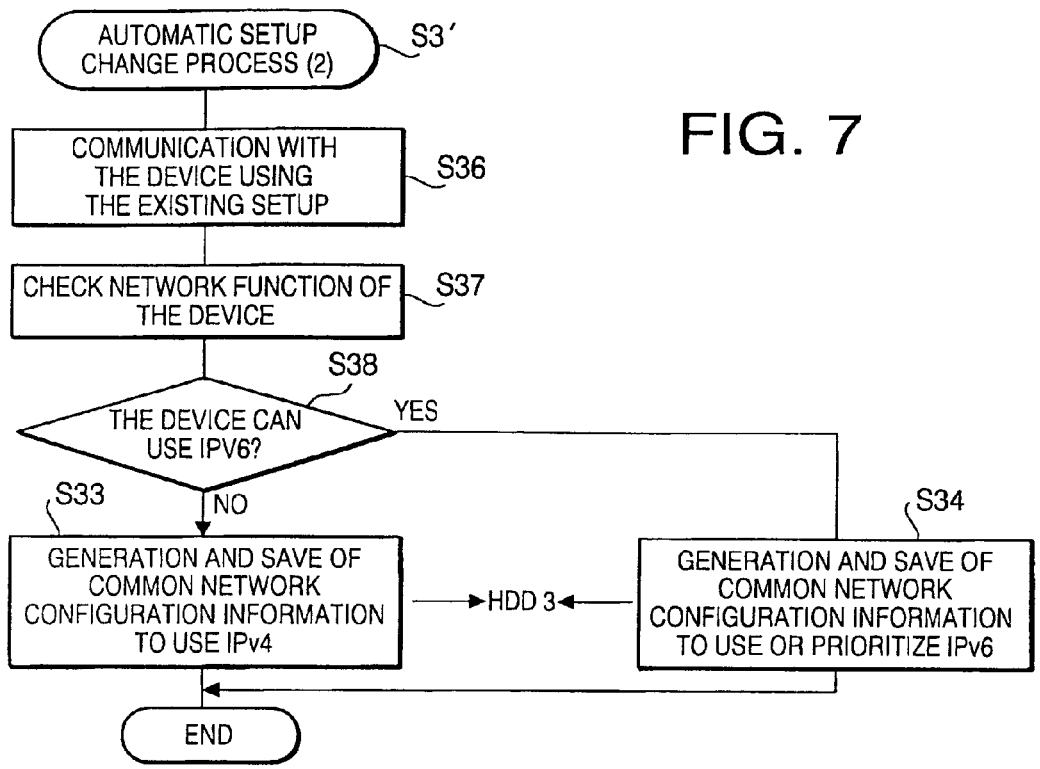
FIG. 7 is a flow diagram which shows the automatic setup change process (the second example) which is executed by the network terminal device of FIG. 1.

The setup change process S2 which the setup change tool 86 executes can be an automatic setup change process S3 shown in FIG. 6. In this case, the setup change tool 86 functions as an automatic setup change unit. The setup change tool 86 acquires information related to the network function of the network terminal device 1 (S31), and updates the contents of the common network configuration information 37*p* (S32-S34) responsive to the information. Specifically, the setup change tool 86 determines whether the network terminal device 1 can communicate using IPv6 (S32) by referring to the system information of the network terminal device 1 (system configuration information) (S31). Then, if the communication is possible using IPv6 (S32: Yes), the setup change tool 86 rewrites the common network configuration information 37*p* to use IPv6 in the communication or prioritize IPv6 (S34). On the other hand, if the communication is not possible using IPv6 (S32: No), the setup change tool 86 rewrites the common network configuration information 37*p* to use only IPv4 in the communication (S33).

The setup change process S2 can also be an automatic setup change process S3'. In this case, the setup change tool 86 also functions as an automatic setup change unit. The setup change tool 86 acquires information related to the network function of the devices 91-96 on the LAN (S36, S37), and updates the contents of the common network configuration information 37*p* (S38, S33, S34) responsive to the information. Specifically, the setup change tool 86 communicates with the devices 91-96 on the LAN using the existing network configuration (S36), and acquires protocols in the status information acquisition process of the devices 91-96. Then, the setup change tool 86 tries to communicate using IPv6. If the communication fails, the setup change tool 86 tries to communicate using IPv4. Then, as the information according the process is recorded, by referring to the information (S37), it is determined whether the devices 91-96 can communicate using IPv6 (S38). Processes in S33 and S34 are similar to the processes in the automatic setup change process S3.

(3) Install Program

Figure 17:
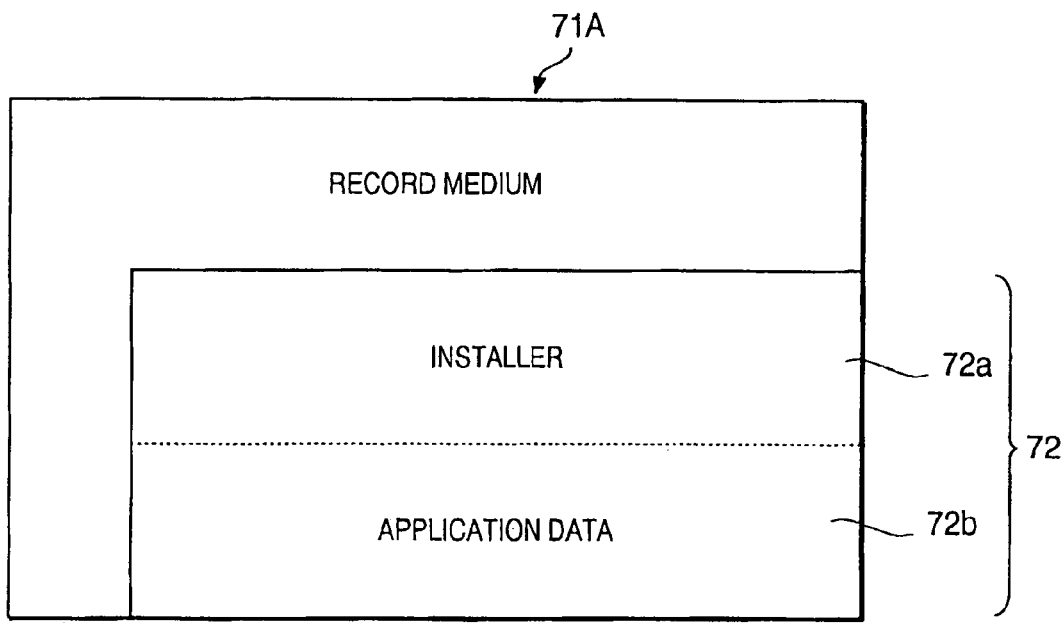
FIG. 17 shows the recorded contents of a record medium which stores an install program.

The install program of the first application 81, the second application 82 and the third application 83 (network application) is described to realize the above described network terminal device 1. FIG. 17 shows recorded contents of the record medium 71A (for example, CD-ROM) which stores the install program 72. The install program 72 includes application data 72*b* which is data of the network application and an installer (setup program) 72*a* which copies the data to the HDD device 3 and executes the necessary setup. Contents of the record medium 71A are read out by the drive device 7 and the contents are input to the control unit 2. Then, the installer 72*a* is booted by the CPU 21, and an install process S9 shown in FIG. 18 starts.

Figure 18:
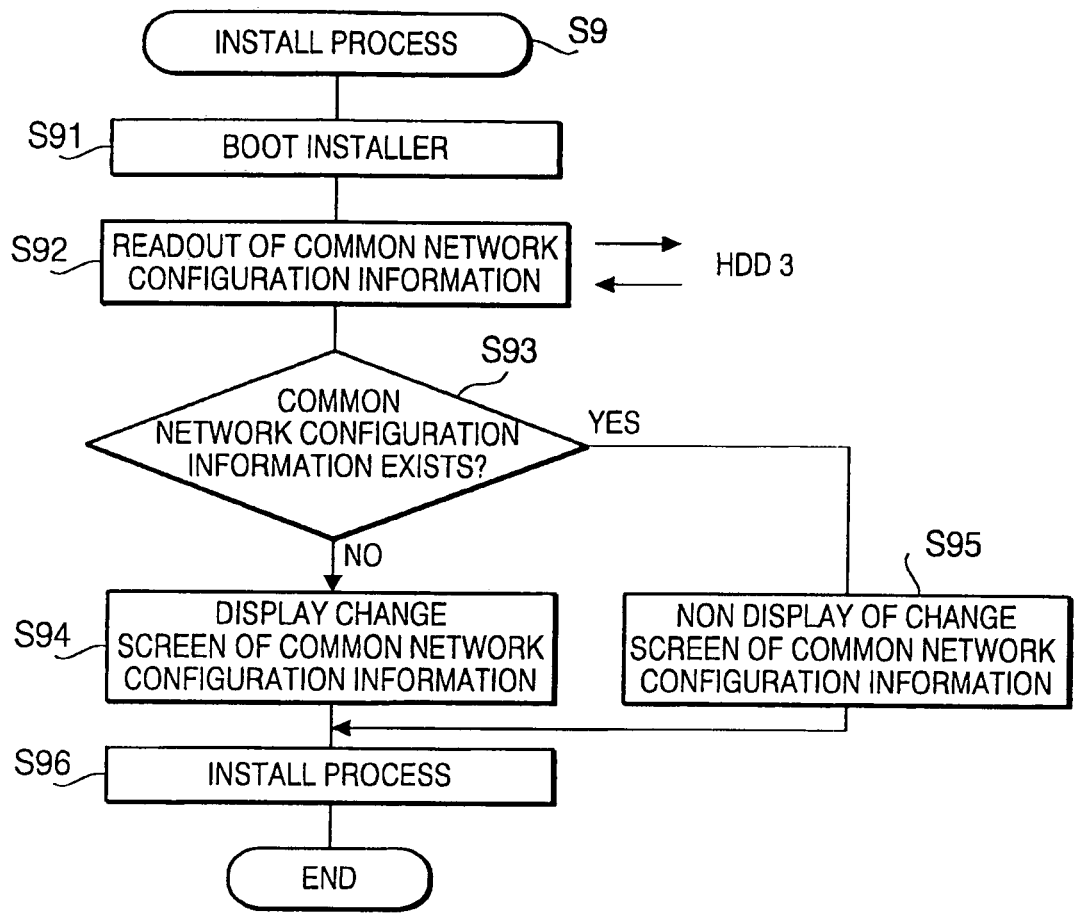
FIG. 18 is a flow diagram which shows an install process.

In the install process S9 shown in FIG. 18, when the installer 72*a* is booted (S91), the common network configuration information 37*p* is read out from the HDD device 3 (S92), and it is determined whether the common network configuration information 37*p* exists (S93). Then, if the common network configuration information 37*p* exists (S93: Yes), the setup change screen of the network configuration is blocked on the display screen 51 of the display unit 5 (S95), and the installer goes to the install process without changing the network configuration (S96). Specifically, in S95, in order to block changes of both of the common network configuration information 37*p* and the network configuration of the application itself, processes to cause the interface to call the setup change screen is to be in nondisplay mode, etc. are executed. On the other hand, if the common network configuration information 37*p* does not exist (S93: No), the setup change screen of the common network configuration information 37 is displayed to urge the user to input (S94), and after the setup input, the installer goes to the install process (S96). Specifically, the setup process of the common network configuration information 37 in S94 is the same as the setup change process S2 shown in FIG. 5.

The present invention is not limited to the above described embodiments. According to the claims of the invention, various embodiments may be realized.

What is claimed is:

1. A network terminal device, comprising:
   a storage unit for storing:
   a plurality of network applications that generate process instructions to cause devices on a network including a printer and a scanner to execute processes, the plurality of network applications includes a printer driver to cause the printer to perform a printing process and a scanner driver to cause the scanner to perform a scanning process,
   individual network configuration information individually set for each of the plurality of network applications, the individual network configuration information including network addresses for specifying the devices, each of which is a communication partner to execute respective network applications, and protocol information indicating protocols supported by the respective network applications, and
   common network configuration information which is the network configuration information common to the plurality of network applications, the common network configuration information includes including determination information to determine a protocol used in a communication with the devices on the network which is common to the plurality of network applications, and
   a processor for reading out the common network configuration information stored in the storage unit and judging whether the protocol determined by the determination information in the common network configuration information is supported by the executed network application based on the protocol information corresponding to the executed network application,
   wherein when the protocol determined by the determination information is supported by the executed network application, the executed network application refers to the common network configuration information in the storage unit and uses the referred configuration information for its own network configuration, and transmits the process instructions to the device on the network which is the communication partner of the executed network application based on the referred network configuration information, and
   wherein when the protocol determined by the determination information is not supported by the executed network application, the network application transmits the process instructions to the device on the network which is the communication partner of the network application based on the protocol indicated by the protocol information corresponding to the network application.

2. The network terminal device according to claim 1, wherein the common network configuration information contains configuration information of ancillary information of the determined protocol.

3. The network terminal device according to claim 1, wherein one of the network applications is an application which generates process instructions to cause a device on the network to return the device's own status information, transmits the instructions, and obtains the status information of the device from the device.

4. The network terminal device according to claim 1, wherein one of the network applications is an application which generates process instructions to cause a device on the network to change configuration information, and transmits the instructions.

5. The network terminal device according to claim 1, wherein one of the network applications is an application which generates process instructions to cause an unspecified device on the network to send a reply, transmits the instructions, detects devices existing on the network, and obtains the status information of the device from the device.

6. The network terminal device according to claim 1, wherein the common network configuration information is stored in the storage unit rewritably, further comprising:
   an operation unit into which update contents of the common network configuration information are input; and
   a setup change unit operated by the processor, the setup change unit updates the contents of the common network configuration information.

7. The network terminal device according to claim 1, wherein the common network configuration information is stored in the storage unit rewritably, further comprising:
an automatic setup change unit operated by the processor, the automatic setup change unit acquires information related to network functions of the network terminal device or network functions of a device on the network, and updates the contents of the common network configuration information automatically responsive to the acquired information.

8. A non-transitory computer-readable medium storing an application program executable by a computer to function as a network terminal device, the application program including a plurality of network applications that generate process instructions to cause devices on a network including a printer and a scanner to execute processes, the plurality of network applications includes a printer driver to cause the printer to perform a printing process and a scanner driver to cause the scanner to perform a scanning process, each of the network applications including network configuration information, the computer executing the steps comprising:
storing individual network configuration information individually set for each of the plurality of network applications and common network configuration information which is the network configuration information common to the plurality of network applications, the individual network configuration information including network addresses for specifying the devices associated with respective network applications and protocol information indicating protocols supported by the respective network applications, and the common network configuration information including determination information to determine a protocol used in a communication with the devices on the network that is common to the plurality of network applications,
reading the common network configuration information;
judging whether the protocol determined by the determination information in the common network configuration information is supported by the executed network application based on the protocol information corresponding to the executed network application;
retrieving and using the stored common network configuration information for the executed network application's own network configuration when the protocol is judged to be supported by the executed network application;
transmitting the process instructions to the device on the network, which is the communication partner of the executed network application, based on the network configuration in which the retrieved network configuration information has been used; and
transmitting the process instructions to the device on the network which is the communication partner of the network application based on the protocol indicated by the protocol information corresponding to the network application without using the common network configuration information when the protocol determined by the determination information is not supported by the executed network application.

9. A non-transitory computer-readable medium storing a network application install program having computer readable instructions executable by a computer having an application program operating thereon causing the computer to function as a network terminal device, the application program including a plurality of network applications that generate process instructions to cause devices on a network, including a printer and a scanner, to execute processes, the plurality of network applications including a printer driver to cause the printer to perform a printing process and a scanner driver to cause the scanner to perform a scanning process, each of the plurality of network applications including network configuration information, and the computer having a storing unit for storing individual network configuration information individually set for each of the plurality of network applications and common network configuration information which is the network configuration information common to the plurality of network applications, the individual network configuration information including network addresses for specifying the devices associated with respective network applications and protocol information indicating protocols supported by the respective network applications, and the common network configuration information including determination information to determine a protocol used in a communication with the devices on the network that is common to the plurality of network applications, the computer executing the steps comprising:
determining whether the common network configuration information is stored;
installing the plurality of network applications without changing the network configuration when the common network configuration is stored;
reading the common network configuration information;
judging whether a protocol determined by determination information in the common network configuration information is supported by the executed network application based on protocol information corresponding to the executed network application;
retrieving and using the common network configuration information for the executed network application's own network configuration when the protocol is judged to be supported by the executed network application;
transmitting the process instructions to a device on the network, which is the communication partner of the executed network application, based on the network configuration in which the retrieved network configuration information has been used; and
transmitting the process instructions to the device on the network which is the communication partner of the network application based on the protocol indicated by the protocol information corresponding to the network application without using the common network configuration information when the protocol determined by the determination information is not supported by the executed network application.

10. The non-transitory computer-readable medium according to claim 9, wherein the network terminal device includes a display unit to display a setup change screen of the network configuration and an interface to call the setup change screen of the network configuration, and the setup change screen of the network configuration is not displayed in the case that the common network configuration information exists.

11. The non-transitory computer-readable medium according to claim 10, wherein the interface is made to be in non-display mode in the case that the common network configuration information exists.

12. The non-transitory computer-readable medium according to claim 9, wherein the network terminal device includes a display unit to display a setup change screen of the network configuration and an interface to call the setup change screen of the network configuration, and the setup change screen of the network configuration is displayed to urge a user's input in the case that the common network configuration information does not exist.

13. The network terminal device according to claim 1, wherein the common network configuration information includes a setup of the Internet protocol indicating whether IPv6 is used in communication or IPv6 is prioritized over IPv4 in communication.

* * * * *